April 25, 1950          T. ZUSCHLAG          2,505,701
MAGNETIC PEAK INSPECTION
Filed June 9, 1945          2 Sheets-Sheet 1
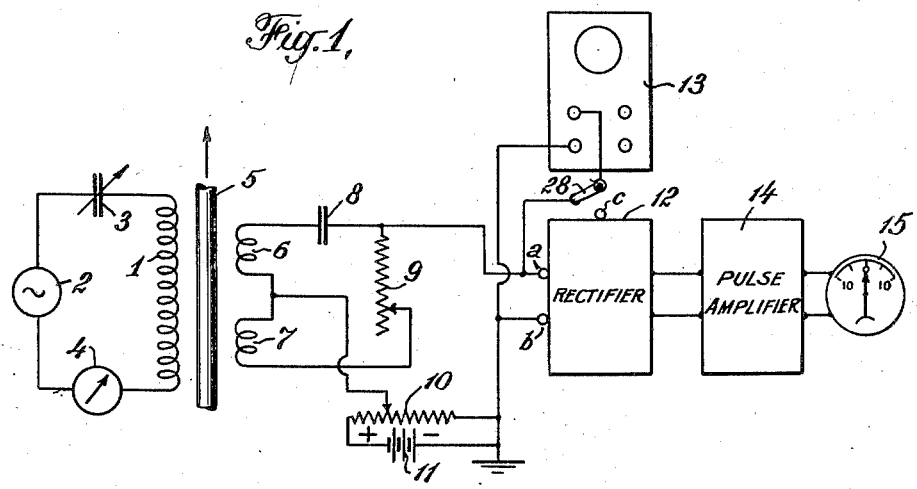
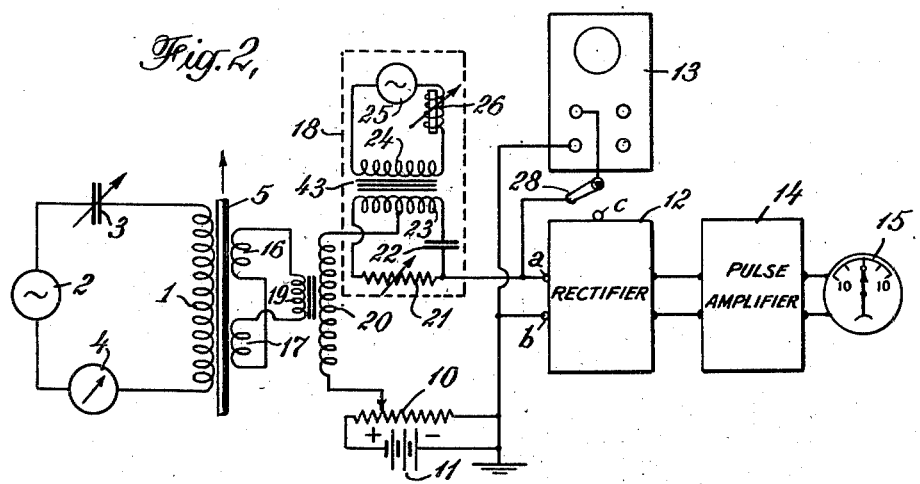
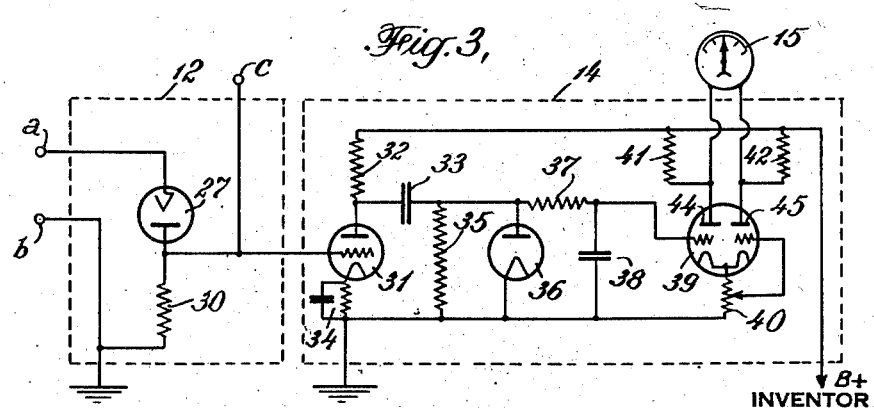
INVENTOR
Theodore Zuschlag
BY
Pennie, Davis, Marvin and Edmonds
ATTORNEYS April 25, 1950 — T. ZUSCHLAG — 2,505,701
MAGNETIC PEAK INSPECTION
Filed June 9, 1945 — 2 Sheets-Sheet 2

INVENTOR
Theodore Zuschlag
BY
Pennie, Davis, Marvin and Edmonds
ATTORNEYS

Patented Apr. 25, 1950

2,505,701

UNITED STATES PATENT OFFICE 2,505,701

MAGNETIC PEAK INSPECTION

Theodore Zuschlag, West Englewood, N. J., assignor to Magnetic Analysis Corporation, Long Island City, N. Y., a corporation of New York Application June 9, 1945, Serial No. 598,496

11 Claims. (Cl. 175—183)

This invention relates to the inspection of magnetic material and particularly to apparatus and methods for investigating instantaneous wave forms resulting from the effect of magnetic propties of the material under inspection upon the shape of sinusoidal currents.

In my previous Patents Nos. 2,144,476, 2,258,837 and in Hana Patent 2,152,690 there are described methods and apparatus for magnetic inspection by analysis of the wave forms at certain points or phases of the waves.

The present invention is an improvement over the prior methods and systems in several particulars, notably in that by means of this invention it is possible to effectively shift the exact portion of the wave form to be investigated so that it appears at the desired peak of the basic sinusoidal wave where it can be readily examined. To this end the invention utilizes a phase selective circuit in combination with other apparatus, as hereinafter described.

Referring to the drawings:

Fig. 1 is a diagram of a simple embodiment of the invention;

Fig. 2 is a diagram of an alternative embodiment of the invention wherein an auxiliary sinusoidal wave is introduced;

Fig. 3 is a circuit diagram of suitable rectifier and pulse-amplifier arrangements represented in block form in Figs. 1 and 2;

Figure 4A:
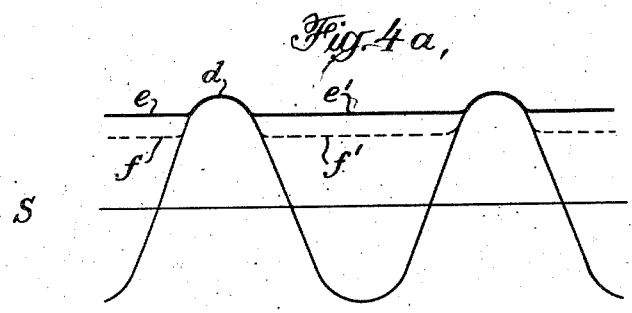
Fig. 4a represents a sinusoidal wave showing positive peak values utilized according to the invention.

Referring to Fig. 1, a suitable source 2 of alternating current, such as 60 cycles, is connected to cause energizing current to flow through energizing coil 1. A condenser 3, preferably adjustable, may be provided in series with the energizing coil to tune the energizing circuit in resonance with the frequency of the power source 2. An ammeter 4 will indicate the point of resonance by a maximum reading. Secondary or pickup coils 6 and 7, which should be identical, are preferably arranged symmetrically with respect to energizing coil 1. Coils 6 and 7 may comprise a single straight winding having a center tap, or the two sections may be stretched apart as illustrated, or alternatively they may comprise two coils positioned one within the other, but connected as shown. Coils 1, 6 and 7 should be disposed in magnetic relation to each other, and also in magnetic relation to the material 5 under inspection. By way of example, coil 1 may comprise approximately 350 turns of #14 double cotton covered wire; and coils 6 and 7 may comprise 150 turns each of #26 single cotton covered wire. Usually suitable provision should be made to move the material 1 under inspection at a uniform rate with respect to coils 1, 6 and 7 so that successive portions thereof will be presented for inspection. The pickup coils 6 and 7 are connected in series aiding in a phase-shifting network including as additional impedance elements condenser 8 and variable resistor 9. Adjustment of the resistance value of resistor 9 will shift the phase of the 60 cycle sinusoidal wave appearing at input terminals a, b, of the peak voltmeter which, as here employed, is somewhat similar to the so-called "slide back" vacuum tube voltmeter. If condenser 8 were varied the amplitude as well as the phase would change which would be undesirable for the purpose described. Potentiometer 10, which is part of the voltmeter, is connected across a suitable source of direct potential 11, and arranged as shown with its slider connected to the midpoint of coils 6 and 7 and its grounded terminal connected to terminal b of the rectifier. The direct-current source 11 may be a separate source as illustrated, or, if more convenient, a common direct current source may be employed for the entire system. The peak voltmeter includes the potentiometer 10, rectifier 12, pulse amplifier 14 and indicating meter 15.

The operation of the phase shift circuit above described may be explained as follows: If the coils 6 and 7 are similar and are symmetrically located with respect to primary coil 1, and if the tap shown connected between coils 6 and 7 is effectively at the midpoint between the extreme terminals of the two coils, equal potentials will be developed between such extreme terminals respectively, and the mid tap. If the resistance of the coils 6 and 7 be neglected and if condenser 8 and resistor 9 be considered to comprise a pure capacity and a pure resistance, respectively, then the phase angle between the two potentials developed across the two components 8 and 9 will always be 90°, provided the input potential impressed across primary coil 1 is of low-frequency and of sinusoidal form. Under these conditions, and provided further that no appreciable current is drawn from the phase shift circuit, the phase change between the input potential across coil 1 and the output potential across output terminals $a$, $b$ may be varied between the limits of approximately 20° and 160° without appreciable change of amplitude at the output terminals. This fact may readily be demonstrated on the oscilloscope 13 shown connected across terminals $a$ and $b$ in Fig. 1, as described below. For practical purposes this phase shift circuit is effective only for a sinusoidal low-frequency component and does not substantially shift the phase of the distortion wave because the latter is not a sinusoidal low-frequency component. Such distortion waves comprise either cyclic transients or a summation of high-frequency components, which effectively, may be, say, of several thousand cycles per second. For such transient or high-frequency components the values of the potentials developed, respectively, across coils 6 and 7, and likewise the value of capacitive reactance introduced by condenser 8, are so small as to be negligible in comparison to the corresponding values in respect to the low-frequency sinusoidal component. Thus by variation of a suitable impedance element such as resistor 9 the low-frequency sinusoidal component can be made to "roll along" or shift with respect to time, whereas the wave distortions appear to remain substantially stationary with respect to time as viewed, for example, on the screen of an oscilloscope. In this manner the distortion wave can be made to appear at any desired point or phase of the sinusoidal wave, and usually for purposes of measurement in accordance with the present invention this point is that of maximum amplitude.

Connectible across the input terminals $a$ and $b$ of the rectifier is an oscillograph 13, as shown. The left-hand terminals of the oscillograph may be assumed to connect to the vertical electrodes, and it may also be assumed that the oscilloscope includes a suitable sweep oscillator connected to the horizontal electrodes. Indicating meter 15, preferably a zero center micro-ammeter, is connected to the output of the pulse amplifier. This meter thus indicates variations in the output of the rectifier. The upper terminal of oscillograph 13 is connectible through a switch 28 either to terminal $a$ or terminal $c$, as shown. Connection to terminal $a$ permits inspection of the complete A. C. wave, whereas connection to terminal $c$ permits inspection of the rectified wave. By the latter connection greater amplification of the distorted wave form may be employed. A detailed circuit diagram of the elements comprising rectifier 12 and pulse amplifier 14 is given in Fig. 3.

The circuit diagram of Fig. 2 illustrates an alternative embodiment of the invention which for some purposes is preferable. It is more sensitive, is self-balancing and may be employed to detect defects of small size including non-uniformity in the specimen itself. The system of Fig. 1, on the other hand, is especially adapted to investigate fairly high input voltages, and is useful for many purposes including measurements of the effect of heat treatment of metallic specimens and variations between different specimens.

In the arrangement of Fig. 2 the energizing circuit is represented to be identical with that described in connection with Fig. 1. The secondary or pickup coils 16 and 17 may be arranged physically as described in connection with coils 6 and 7 of Fig. 1, but in this instance the coils are connected in series opposition in a series circuit including primary 19 of a coupling transformer of which coil 20 is the secondary. By way of example, coils 16 and 17 may have the same number of turns as coils 6 and 7 of Fig. 1. Secondary coil 20 is connected to a phase-shifting circuit including as impedance elements condenser 22 and variable resistor 21 in series with secondary winding 23 of a coupling transformer 43. Primary 24 of transformer 43 is connected through a variable reactance 26 to an auxiliary source 25 of alternating current which generates a low-frequency current of sinusoidal wave form, as before. The voltage of this source, as well as source 2 of Fig. 1, should be as closely regulated as possible. It is here necessary to introduce an auxiliary sinusoidal wave into the phase shifting system because coils 16 and 17 are connected in opposition, and the resulting differential wave is of such small potential as to be incapable of satisfactory rectification. However, by adding it to the potential of the wave of source 25, the resultant may be readily rectified. The remainder of the arrangement of Fig. 2, is, in general, similar to that described above in connection with Fig. 1. In the present arrangement one end of secondary coil 20 is connected to a mid-tap on secondary coil 23 of transformer 43, and to the other end of coil 20 is connected the slider on potentiometer 10. A suitable source 11 of direct current is connected, as before, across the resistance element of potentiometer 10, and the output of the phase-shifting system is connected to input terminals $a$ and $b$ of the rectifier of the vacuum tube voltmeter, and to these same terminals the oscillograph 13 is also connected. An indicating meter 15 is connected to the output of pulse amplifier 14 which is fed from the rectifier 12, as previously explained.

In Fig. 3 are shown the circuit connections of a suitable rectifier and pulse amplifier represented generally in Figs. 1 and 2. The input terminals $a$ and $b$ shown in the preceding diagrams are connected, as illustrated, to the input of a rectifier circuit including diode 27 and resistor 30. This diode may, for example, comprise a type 6H6 tube. If the connections to ground are made as illustrated, the slider of potentiometer 10 is connected through the phase-shifting network to the cathode of diode 27, the anode of which is connected to the grid of amplifier tube 31 which may, for example be a tube type 6J5. Terminal $c$ is directly connected to the output of diode 27 so that the oscillograph is across resistor 30 for the purpose mentioned in connection with Fig. 1, when the switch 28 is in contact with terminal $c$.

The input of amplifier tube 31 is also connected across resistor 30, and the plate of tube 31 is connected through series resistor 32 to the B+ terminal of a suitable power supply, while the cathode is connected to ground by means of a bias resistor-condenser combination 34, as is customary in the art. The plate of tube 31 is connected through coupling condenser 33 to the load resistor 35. Across this load resistor are connected the anode and cathode of a second diode rectifier 36 which may also be of the type 6H6, for example. Diode 36 is shunted by resistor 37 in series with condenser 38, the common connection between resistor 37 and condenser 38 being connected to the left-hand grid (as illustrated) of a double triode amplifier tube 39 which, for example, may be of the type 6SN7, while the right-hand grid is connected to the slider of potentiometer 40 which is connected between the common cathodes and ground. The two plates of tube 39 are connected to the B+ terminal through similar load resistors 41 and 42, respectively, and are also connected, as shown, to indicator or meter 15. This is the same meter shown in the previous figures.

Briefly, the operation of the vacuum tube voltmeter, including rectifier 12 and pulse amplifier 14 as illustrated in Fig. 3, may be explained as follows: The positive peaks of the alternating current impressed at terminals $a$ and $b$ are rectified by diode 27 so that the output comprises uni-directional pulses. These pulses are amplified by triode 31 which also introduces an A. C. component due to the presence of coupling elements 33—35. Hence an additional rectifier 36 is connected across resistor 35 to rectify this A. C. component. The resulting uni-directional output is impressed on D. C. amplifier 39 through coupling elements 37—38. It will be seen that the current through load resistor 42 will be of steady value which depends upon the setting of potentiometer 40, whereas the current through resistor 41 will fluctuate in proportion to the potential applied to input terminals $a$ and $b$. Thus by adjustment of potentiometer 40, meter 15 may be balanced to zero position in the absence of impressed voltage fluctuations.

The well-known slide back voltmeter operates upon the principle of measuring the voltage value required to return to zero a voltmeter which has been deflected by applied voltage of an unknown value. However, in the system according to the present invention there is no need for measuring the actual applied alternating voltage and so no voltmeter is included to indicate the value of direct current selected by adjustment of potentiometer 10 to balance the effect of the applied voltage. It is here sufficient merely to balance out most of the sinusoidal voltage as indicated by oscillograph 13 so that the reproduced wave form is limited to the actual peak values on which are superimposed the wave form distortion to be observed.

Fig. 4a shows the effect on the sinusoidal wave S caused by the adjustment of the potentiometer 10 to different positions. For example, as the slider is moved toward the positive end, the reproduced peak of the wave $f$, $d$, $f'$ might be "shaved off" to a smaller peak $e$, $d$, $e'$. Then, if a distorted wave is superimposed on the exact peak of the sinusoidal wave, the trace on the oscillograph screen of the rectified distorted wave will be substantially free of the sinusoidal wave and will appear something like a trace shown in Fig. 4c.

Figure 4B:
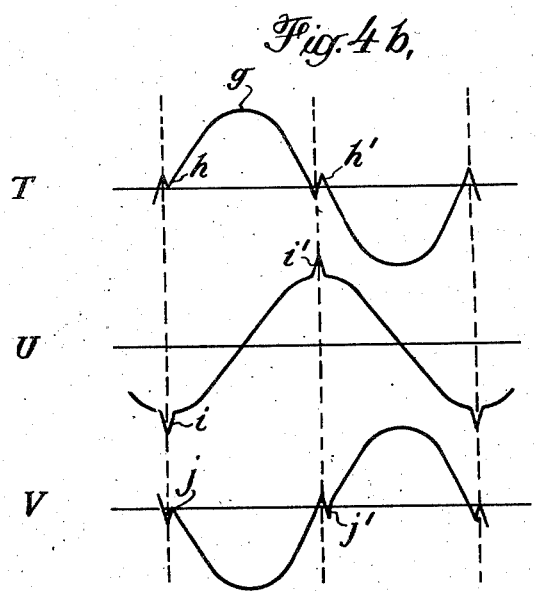
Fig. 4b illustrates a typical instantaneous wave form distortion appearing at different positions or phases of the wave.

Fig. 4b illustrates the effect of adjusting the phase-shifting circuit by variation of resistor 9 of Fig. 1, or resistor 21 of Fig. 2. In the three curves T, U, V, the same sinusoidal wave and the same distorted wave form are shown, the only difference between the three curves being that the wave distortion is represented at three different phases of the sinusoidal wave. The phase relation of curves T and U is 90° and the phase relation of curves T and V is 180°. It is obvious that the wave form distortions indicated at $h$ and $h'$ on curve T and at $j$ and $j'$ on curve V are of extremely low potentials and, therefore, would be difficult to record. On the other hand by shifting the distorted wave to the peak of the sinusoidal wave as shown at $i$ and $i'$ of curve U an effective potential as large as required is available. For ordinary measurement purposes it is of no consequence whether the negative peak $i$ or the positive peak $i'$ is employed, because it is the nature of the distortion waves themselves which is representative of characteristics of the body being investigated. As a matter of convenience it is assumed in connection with the present description that the positive peak $i'$ is utilized, as shown in Figs. 4a and 4c.

Figure 4C:
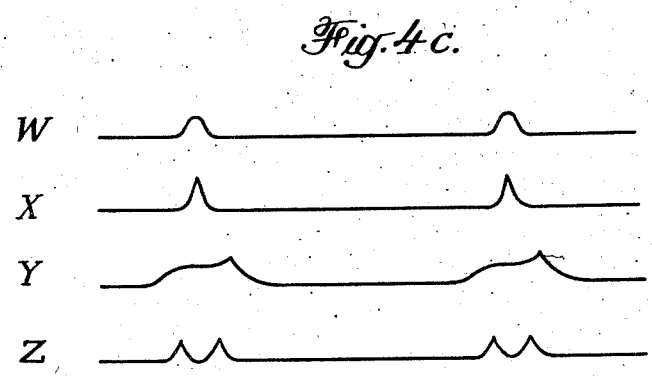
Fig. 4c illustrates four of a large variety of wave form distortions or shapes which may be observed in utilizing this invention.

In actual practice I have found that the instantaneous wave form distortion which will be observed in the use of apparatus in accordance with this invention may take a variety of different shapes and characteristics, viz., they may be round, elongated, or sharp single peaks, or sharp multiple peaks, as illustrated in curves W, X, Y and Z of Fig. 4c. The amplitude, as well as the shape, of these peaks will in many cases vary with the chemical composition or the physical condition of the material under investigation so that by observing the variation in amplitude or shape of the distorted wave form at a given maximum phase point of the sinusoidal wave valuable information as to changes in chemical composition or physical condition can be quickly obtained.

In the table below are listed values of circuit elements which may be employed in practicing the invention herein described. It is to be understood, however, that these values, as well as those stated elsewhere in this specification, are given solely by way of example and not as a limitation of the invention defined in the appended claims.

| | | |
|---|---|---|
| Potentiometer 10 | ohms | 10,000 |
| Potentiometer 40 | do | 2,000 |
| Resistors 9 and 21 | do | 10,000 |
| Resistor 30 | do | 15,000 |
| Resistor 32 | do | 100,000 |
| Resistor 35 | do | 250,000 |
| Resistor 37 | do | 50,000 |
| Resistors 41 and 42 | do | 10,000 |
| Condensers 8 and 22 | microfarad | 1 |
| Condenser 33 | do | .05 |
| Condenser 38 | do | .1 |

*Operation*

The following description of the method of operating the apparatus herein described is given by way of example:

A standard specimen 5 of known properties and analysis is first inserted in inductive relation with coils 1, 6 and 7 of the coil system of Fig. 1, for example. The resulting wave may then be viewed on the screen of an oscillograph 13 and potentiometer 10 adjusted to give a zero reading on microammeter 15. (It is assumed that potentiometer 40 of Fig. 3 has been previously set to provide suitable plate current through anode 45 and load resistor 42 of amplifier tube 39 for the contemplated tests. This adjustment is not particularly critical. It is also assumed that a suitable energizing current has been caused to flow through energizing coil 1 by adjustment of condenser 3.) Adjustment of potentiometer 10 varies the effective voltage impressed on the cathode of diode 27 (Fig. 3) in opposition to the alternating potential impressed on the diode through terminals $a$ and $b$, viz., the impressed voltage is in opposition to the half of the wave to be rectified. The effect of this is to cut off the peaks of the sinusoidal potential waves to a minimum, as described in connection with Fig. 4a, for the purpose of emphasizing the distorted wave form. The standard specimen is now removed and the unknown specimen substituted therefor in the coil system. If the unknown specimen is identical with the standard, deflection of meter 15 and the wave observed on the oscillograph will be the same as before. However, if the unknown specimen differs from the standard then a new wave pattern will be observed on oscillograph 13, at some point of adjustment of phase shifting resistor 9.

In order to locate and observe the new wave pattern due to wave form distortion resulting from a different characteristic of the unknown specimen, it is sometimes necessary to scan or observe all parts or phases of the sinusoidal wave. This may be done, as illustrated in Fig. 4b by observing the screen of oscillograph 13 while resistance 9 is varied. Adjustment of resistor 9 effectively shifts the phase of the sinusoidal wave without shifting the phase of the distorted wave to be observed, because of the separable natures of the two wave forms especially as to frequency. Consequently variation of resistor 9 effectively "rolls" the sinusoidal wave in one direction or to the other while the distorted wave relatively stands still. By this means it is possible to shift or "roll" the sinusoidal wave until the peak or any other desired portion or phase thereof coincides with the distorted wave form. If the wave form distortion is small it may more readily be seen on the oscilloscope 13 by suitable adjustment of the rate of the sweep oscillator which is assumed to be a part of the oscilloscope, in order to show a large image of part of the wave, such, for example, as one-half of the wave. If the distorted wave be very small it might not be visible at all on the oscillograph screen, but it will increase the average potential on the left-hand grid of amplifier tube 39, and therefore produce a deflection of meter 15. This deflection will be on one or the other side of the zero center depending upon whether the positive or negative peak is being indicated, and the indication will be steady because the meter 15 will indicate the R. M. S. value of the rectified voltage waves.

The operation of the system of Fig. 2 is generally similar to that of Fig. 1 above described, the phase shifting resistor 21 here taking the place of resistor 9 of Fig. 1. In this system, however, the magnitude of the alternating current potential from auxiliary source 25 may be suitably regulated by variable reactance 26 to provide a satisfactory indication of the desired wave form on oscillograph 13 or meter 15, or both. If it be desired to inspect the rectified wave form on the oscillograph, switch 28 may be moved to terminal c. This facility is more likely to be employed in connection with the system of Fig. 2 because the latter is inherently capable of detecting smaller distortion waves than is the system of Fig. 1.

What I claim is:

1. The method of inspecting magnetic material which comprises, generating a low-frequency sinusoidal alternating current magnetic field, subjecting said material to said field whereby to distort said field, generating in a detector circuit a composite voltage wave derived from said field comprising a sinusoidal wave and a distorted wave of separable frequency characteristics due to the magnetic influence of said material on said field, shifting the phase of said sinusoidal wave with respect to said distorted wave to cause the peak of said sinusoidal wave to coincide with said distorted wave so as to form a composite wave peak, rectifying and amplifying said composite wave peak, rectifying and amplifying said composite wave peak to provide an average voltage, and indicating said voltage.

2. In apparatus for magnetic analysis of a magnetizable body, an energizing coil and a detecting coil arranged to be in magnetic relation to each other and to a body to be analyzed, means for connecting a source of substantially sinusoidal low-frequency voltage to said energizing coil, a rectifier, an adjustable source of unidirectional potential connected on one side to said rectifier in opposition to the half wave to be rectified so as to limit the effective maximum potential impressed on said rectifier and connected on the other side to a mid tap on said detecting coil, circuit means linking said rectifier and said detector coil including a phase shifting network comprising a condenser and a variable resistor connected in series across said detecting coil by which the phase of low frequency sinusoidal waves induced in said circuit means may be adjusted with respect to relatively high frequency distortion waves induced in said circuit means resulting from the magnetic effect of said body on the alternating voltage induced in said detecting coil by said energizing coil, means connectible to said circuit means to indicate the effect of said phase-shifting network with respect to said waves, an indicating device, and a pulse amplifier coupling said rectifier and said indicating device.

3. In apparatus for the magnetic analysis of a magnetic body, an energizing coil and a detecting coil arranged to be in magnetic relation to each other and to a body to be analyzed, means for connecting a source of substantially sinusoidal low-frequency voltage to said energizing coil, a rectifier, a phase-shifting circuit comprising a plurality of phase-changing impedance elements one of which is adjustable, said elements being so proportioned that variation of the impedance of said adjustable element adjusts the phase of sinusoidal low-frequency waves induced in said circuit with respect to the phase of effectively higher frequency distortion waves induced therein which result from the magnetic effect of said body on the alternating voltage induced in said detecting coil by said energizing coil, said circuit being connected effectively to couple said detecting coil to said rectifier, an adjustable source of uni-directional potential connected to said rectifier in opposition to the half of the wave to be rectified so as to limit the effective maximum potential impressed on said rectifier, and an indicating device connected to indicate the output of said rectifier.

4. In apparatus for the magnetic analysis of a magnetic body, an energizing coil and a detecting coil arranged to be in magnetic relation to each other and to a body to be analyzed, means for connecting a source of substantially sinusoidal low-frequency voltage to said energizing coil, a rectifier, a phase-shifting circuit comprising a plurality of phase-changing impedance elements one of which is adjustable, said elements being so proportioned that variation of the impedance of said adjustable element adjusts the phase of sinusoidal waves induced in said circuit with respect to the phase of distortion waves induced therein which result from the magnetic effect of said body on the alternating voltage induced in said detecting coil by said energizing coil, said circuit serving effectively to couple said detecting coil to said rectifier, an oscilloscope, and means for connecting said oscilloscope to the output of said phase-shifting circuit to indicate the effect thereof with respect to said waves, an adjustable source of uni-directional potential connected to said rectifier in opposition to the half of the wave to be rectified so as to limit the effective maximum potential impressed on said rectifier, an amplifier connected to amplify the output of said rectifier, and an indicating device connected to the output of said amplifier.

5. In apparatus for the magnetic analysis of a magnetic body, an energizing coil arranged to be in magnetic relation to a body to be analyzed, means for connecting a source of substantially sinusoidal low-frequency voltage to said energizing coil to produce a corresponding magnetic field, a rectifier, a phase shifting circuit comprising an inductance coil, a capacitor and a resistance connected effectively in series with each other, means for impressing on said phase shifting circuit a substantially sinusoidal low-frequency wave component and for impressing on said circuit a distortion wave component resulting from the magnetic effect of said body on said field, said wave components being effectively of frequencies respectively separable by said circuit, a connection from the input of said rectifier to a point between said capacitor and said resistor, and a connection including a source of uni-directional potential between the input of said rectifier and a mid-tap on said inductance coil, said source of uni-directional potential being connected in opposition to the half of the wave to be rectified by said rectifier so as to limit the effective maximum potential impressed on said rectifier, and an indicating device coupled to the output of said rectifier.

6. Apparatus according to claim 5 in which said resistor is variable, and the elements of said circuit are so proportioned that variation of said resistor adjusts the phase of the sinusoidal component in said circuit with respect to the phase of distortion wave components therein which result from the magnetic effect of said body on the sinusoidal voltage derived from said energizing coil.

7. Apparatus according to claim 5, in which said inductance coil comprises a detecting coil arranged to be in magnetic relation to said energizing coil and to a body to be analyzed, said rectifier includes an anode connected to the negative side of said direct-current source and a cathode connected to said point between said capacitor and said resistor, and said source of uni-directional potential comprises a direct-current source shunted by a potentiometer, the adjustable tap on said potentiometer being connected to the midpoint of said detecting coil.

8. In apparatus for the magnetic analysis of a magnetizable body, an energizing coil and a detecting coil arranged to be in magnetic relation to each other and to a body to be analyzed, means for connecting a first source of substantially sinusodal low-frequency voltage to said energizing coil, said detecting coil being divided into two symmetrical portions connected in series opposition, a rectifier, a phase-shifting circuit comprising a plurality of phase-changing impedance elements one of which is adjustable, said elements being so proportioned that variation of the impedance of said adjustable element adjusts the phase of sinusoidal low-frequency waves induced in said circuit with respect to the phase of distortion waves of effectively higher frequency induced therein which results from the magnetic effect of said body on the alternating voltage induced in said detecting coil by said energizing coil, means for coupling an undistorted substantially sinusoidal voltage of said low frequency to said phase-shifting circuit, means for adjusting the magnitude of said last-mentioned voltage impressed on said circuit, said circuit being connected effectively to the input of said rectifier, an adjustable source of uni-directional potential connected between a point in said circuit and the input of said rectifier in opposition to the half of the wave to be rectified so as to limit the effective maximum potential impressed on said rectifier, and an indicating device coupled to the output of said rectifier.

9. In apparatus for the magnetic analysis of a magnetizable body; an energizing coil and a detecting coil arranged to be in magnetic relation to each other and to a body to be analyzed; a first transformer having a primary and a secondary; means for connecting a source of low-frequency substantially sinusoidal voltage to said energizing coil, said detecting coil being divided into two symmetrical portions connected in series with said primary and in series opposition with each other; a second transformer having a primary coil and a secondary coil; a rectifier; a phase-shifting circuit comprising as elements thereof the secondary coil of said second transformer, a capacity and a variable resistor connected in series with each other, said elements being so proportioned that variation of said resistor adjusts the phase of sinusoidal low-frequency waves induced in said circuit with respect to the phase of distortion waves of effectively higher frequency induced therein which result from the magnetic effect of said body on the alternating voltage induced in said detecting coil by said energizing coil; means impressing on said primary coil of said second transformer an undistorted substantially sinusoidal voltage of said low frequency; means for adjusting the magnitude of said last-mentioned voltage; a source of uni-directional potential connected between the mid-point of the secondary coil of said second transformer and an input terminal of said rectifier in opposition to the half of the wave to be rectified so as to limit the effective maximum potential impressed on said rectifier, said last-named connection including the secondary of said first transformer; a connection between a point in said phase-shifting circuit between said capacity and said resistor and the other input terminal of said rectifier; an amplifier connected to amplify the output of said rectifier; and an indicating device connected to the output of said amplifier.

10. In apparatus for the magnetic analysis of a magnetizable body; an energizing coil and a detecting coil arranged to be in magnetic relation to each other and to a body to be analyzed; a first transformer having a primary and a secondary; means for connecting a source of low-frequency substantially sinusoidal voltage to said energizing coil; said detecting coil being divided into two symmetrical portions connected in series with said primary and in series opposition with each other; a second transformer having a primary coil and a secondary coil; a rectifier having an anode and a cathode; a phase-shifting circuit comprising as elements thereof the secondary coil of said second transformer, a capacity and a variable resistor connected in series with each other, said elements being so proportioned that variation of said resistor adjusts the phase of sinusoidal low-frequency waves induced in said circuit with respect to the phase of distortion waves of effectively higher frequency induced therein which result from the magnetic effect of said body on the alternating voltage induced in said detecting coil by said energizing coil; means impressing on said primary coil an undistorted substantially sinusoidal voltage of said low frequency; means for adjusting the magnitude of said last-mentioned voltage; a source of uni-directional potential; a potentiometer connected across said uni-directional source; a connection from the adjustable tap of said potentiometer to one terminal of the secondary of said first transformer; a connection from the other terminal of said last-named secondary to a mid-tap on the secondary coil of said second transformer; a connection from the negative terminal of said uni-directional source to the anode of said rectifier; a connection from the cathode of said rectifier to a common connection point between said capacity and said variable resistor; an oscilloscope connectible across the anode and cathode of said rectifier; an amplifier connected to amplify the output of said rectifier; and an indicating device connected to the output of said amplifier.

11. In apparatus for the magnetic analysis of a magnetic body, an energizing coil and a detecting coil arranged to be in magnetic relation to each other and to a body to be analyzed, means for connecting a source of substantially sinusoidal low-frequency voltage to said energizing coil whereby distortion waves of frequencies considerably higher than said low frequency are induced in said detecting coil as a result of the magnetic effect of said body on the alternating voltage induced in said detecting coil by said energizing coil, said distortion waves being representative of certain characteristics of said body, a plurality of impedance elements connected in a phase-changing circuit and proportioned to introduce substantial impedance at the low frequency of said sinusoidal voltage and insubstantial impedance at the high frequencies of said distortion waves, means for adjusting at least one of said phase-changing elements so as to shift over a range of more than 90° the phase of potentials at said low frequency with respect to potentials at said high frequency in said circuit, a rectifier, said circuit being connected effectively to couple said detecting coil to said rectifier, and an indicating device connected to the output of said rectifier to indicate a potential representative of said distortion waves.

THEODORE ZUSCHLAG.

REFERENCES CITED

The following references are of record in the file of this patent:

UNITED STATES PATENTS

| Number | Name | Date |
| --- | --- | --- |
| 1,686,815 | Imes | Oct. 9, 1928 |
| 1,897,634 | De Forest | Feb. 14, 1933 |
| 2,152,690 | Hana | Apr. 4, 1939 |
| 2,337,231 | Cloud | Dec. 21, 1943 |
| 2,415,789 | Farrow | Feb. 11, 1947 |

Certificate of Correction

Patent No. 2,505,701 April 25, 1950

THEODORE ZUSCHLAG

It is hereby certified that errors appear in the printed specification of the above numbered patent requiring correction as follows:

Column 7, line 17, after "or" strike out "to"; lines 68 and 69, strike out the words and comma "rectifying and amplifying said composite wave peak,";

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*